May 19, 1936. R. L. EVANS Re. 19,972

HAIR WAVING PAD

Original Filed Jan. 21, 1932

INVENTOR

Ralph L. Evans

BY

Brown & Terrell

ATTORNEYS

Reissued May 19, 1936

Re. 19,972

UNITED STATES PATENT OFFICE 19,972

HAIR WAVING PAD

Ralph L. Evans, New York, N. Y., assignor to Zotos Corporation, New York, N. Y., a corporation of New York Original application January 21, 1932, Serial No. 587,890. Divided and application May 6, 1932, Serial No. 609,755. Patent No. 1,875,228, dated August 30, 1932. This application for reissue April 4, 1933, Serial No. 664,373

13 Claims. (Cl. 132—36.2)

This invention relates to that class of hair waving in which a so-called permanent wave is imparted to a pre-formed tress of hair by subjecting the tress to the action of a heating chemical, such as calcium oxide, which, when moistened, will of itself generate sufficient heat to impart a permanent wave to the said tress.

My invention comprises a hair waving pad of novel construction, said pad having an outer wrapper, an inner wrapper provided with a foldable flap, an envelope containing a heating chemical, and an inner sheet of absorbent material adapted to be moistened and placed between the flap and envelope for coaction with the heating chemical.

An example of a hair waving pad embodying my invention is represented in the accompanying drawing in which.

Figure 1:
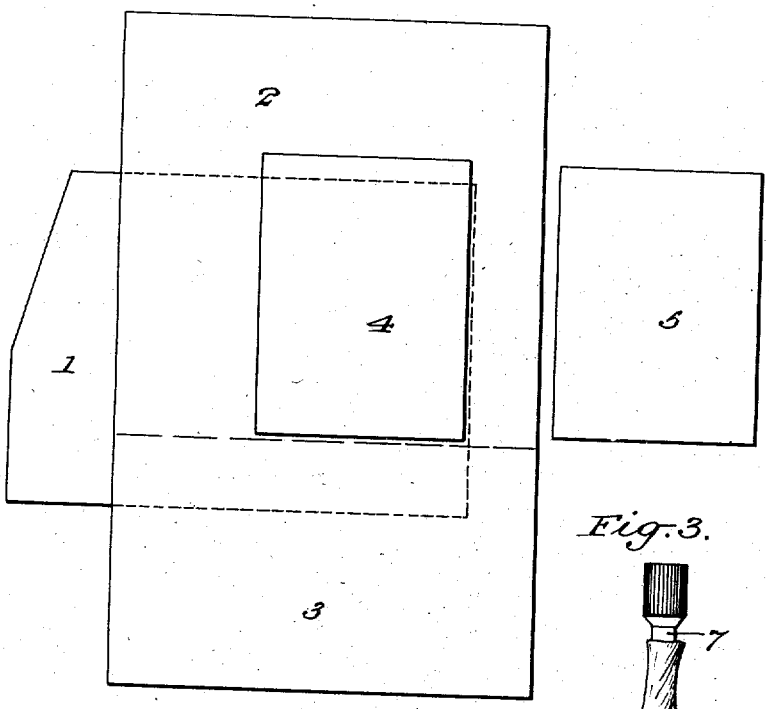
Fig. 1 represents an inside plan view of the pad in its unwrapped condition, the inner absorbent sheet being shown at the side of the pad and the inner wrapper sheet being shown unfolded.
Figure 3:
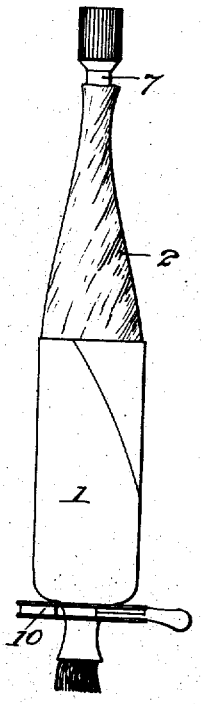
Fig. 3 represents a side view of the pad wrapped around a wound tress as in use.
Figure 4:
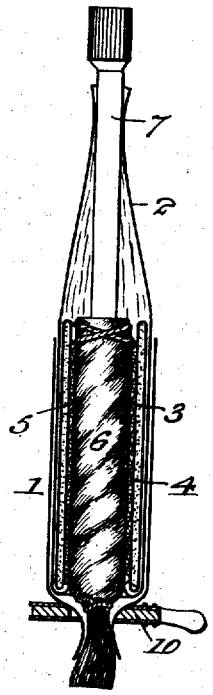
Fig. 4 represents a longitudinal central section through the wrapped pad.
Figure 2:
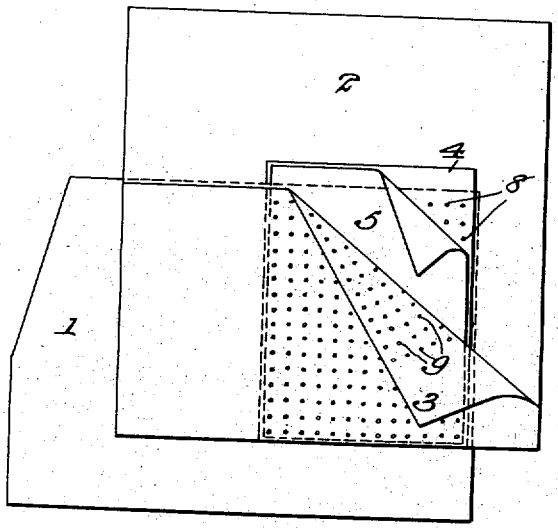
Fig. 2 represents an inside plan view of the pad in its unwrapped condition after the inner wrapper flap has been perforated and the inner face of the chemical containing envelope has been perforated, the inner absorbent sheet being shown interposed between the inner face of the heating chemical containing envelope and the inner wrapper flap.

The outer wrapper of the self waving pad is denoted by 1 and is preferably made of non-absorbent material, as for instance paper. The inner wrapper or backing is denoted by 2 and is preferably made of metal foil, in the form of a strip as shown in the drawing. This inner wrapper is provided with a foldable flap or fly 3, projecting beyond one edge of an envelope 4 composed of a perforable impervious material, such as metal foil, which envelope is attached to the inner face of the inner wrapper 2, and contains a heating chemical, such as calcium oxide in powdered form, which chemical, when moistened, will of itself generate sufficient heat to impart a so-called permanent wave to a preformed tress when enclosed within the pad. It will thus be seen that the flap 3, shown as being a part of the wrapper 2, is thereby secured to the chemical containing envelope.

An inner removable sheet 5 of absorbent material, such as cotton fabric, is arranged to be moistened and inserted between the flap 3 and the envelope 4 after the inner face of the envelope 4 and the folded over flap 3 of the inner wrapper have been perforated. The pressing of the flap back into place will squeeze the moisture from the wetted inner sheet into the envelope containing the heating chemical.

In practice, the tress 6 is wound as usual around a mandrel 7. The tress may be moistened either before or after it is wound, by a suitable waving solution, such for instance as an ammonia solution. The inner face of the impervious envelope 4 containing the hair waving chemical is perforated as shown at 8, and the folded over flap 3 of the inner wrapper may be perforated at the same time as shown at 9. The inner sheet 5 is moistened by water or by a suitable hair waving solution, such as that used for moistening the tress 6.

Either the solution or the self heating chemical within the envelope may be treated to produce the results hereinbefore set forth.

The pad is then wrapped around the preformed tress and is preferably secured in position at the scalp end of the tress by a suitable scalp protecting guard of well known or approved form, such for instance as the self locking guard 10 shown in the accompanying drawing. The outer end of the pad may be secured around the mandrel 7, as for instance by twisting the outer wrapper of the pad around the same. The exothermic action starts at once because of the application of moisture by the wetted inner sheet 5 of the pad to the self heating chemical through the perforations in the inner face of the impervious envelope. Heat is then set up within the pad in order to impart a so-called permanent wave to the pre-formed tress without requiring application of heat from an outside source. It will be seen that the outside wrapper of the pad serves to confine the heat to a large extent within the pad, the steam generated by the combination of the treating solution with the chemical being permitted to escape through the crimped outer end of the outer wrapper.

This application is a division of my copending application filed January 21, 1932, Serial No. 587,890, entitled Method of and means for permanently waving hair.

What I claim is:

1. A hair waving pad for enclosing a preformed tress, said pad comprising an outer wrapper, an inner wrapper having a foldable flap, an envelope containing a chemical which, when moistened, will generate sufficient heat to impart a permanent wave to the tress, and an absorbent sheet adapted to be moistened and placed between the flap and envelope.

2. A hair waving pad for enclosing a preformed tress, said pad comprising a non-absorbent outer wrapper, an impervious inner wrapper having a foldable flap, an impervious envelope containing a chemical which, when moistened, will generate sufficient heat to impart a permanent wave to the tress, and an absorbent sheet adapted to be moistened and placed between the flap and envelope, said flap and envelope being perforable.

3. A hair waving pad for enclosing a preformed tress, said pad comprising an outer wrapper, an envelope containing an exothermic material, an inner wrapper, and an intermediate absorbent sheet interposed between the envelope and the inner wrapper.

4. A hair waving pad for enclosing a preformed tress, said pad comprising a non-absorbent outer wrapper, a perforably impervious envelope containing an exothermic material, an inner impervious wrapper, and a moistenable intermediate absorbent sheet interposed between the envelope and the inner wrapper.

5. A hair waving pad for enclosing a preformed tress, said pad comprising a non-absorbent outer wrapper, a perforable impervious envelope containing an exothermic material, a perforable inner impervious wrapper, and a moistenable intermediate absorbent sheet interposed between the envelope and the inner wrapper.

6. A hair waving pad for enclosing a preformed tress, said pad comprising an outer wrapper of paper, an envelope of metal foil containing an exothermic material, an inner wrapper of metal foil, and an intermediate sheet of absorbent material.

7. A hair waving pad for enclosing a preformed tress, said pad comprising an outer wrapper of paper, a perforable envelope of metal foil containing an exothermic material, a perforable inner wrapper of metal foil, and a moistenable intermediate sheet of obsorbent material.

8. A hair waving pad comprising a flexible metallic container, a chemical therein adapted to produce heat when contacted with moisture, a member adapted to absorb moisture and a metallic flap projecting at one edge of the container and adapted to be folded thereover.

9. A hair waving pad comprising a flexible metallic container, a chemical therein, adapted to produce heat when contacted with moisture, means to apply moisture to the chemical, said means comprising a member adapted to be liquid impregnated and a metallic flap projecting at one edge of the container and adapted to overlie the liquid impregnated member.

10. A sachet for permanent waving of hair comprising a wrapper, a backing secured to said wrapper, an envelope mounted on said backing and having a chemical therein, a fly secured to said backing and foldable along one edge of said envelope to overlie the surface thereof, said fly and the corresponding surface of said envelope being perforate and a moistening member disposed between said fly and envelope and impregnated with a liquid for infusion into the chemical in said envelope.

11. In a pad for permanent waving of hair, a paper wrapper for confining moisture, an impervious envelope associated with said wrapper adapted for carrying chemicals having the property of giving off heat when coming in contact with moisture, and an impervious layer of material interposed between said wrapper and envelope, said impervious layer of material having a portion thereof extending beyond one edge of said envelope and being adapted to be folded over to cover the outer surface of said envelope.

12. A hair waving device, comprising a perforable, hermetically sealed envelope containing a chemical substance adapted to generate heat when moistened, a backing strip secured thereto and extending beyond the edges of said envelope, a flap of cloth adapted to be moistened and placed over a face of said envelope, and a piece of metal foil adapted to overlie said cloth flap, the entire assembly being adapted to be wound around a coil of hair to substantially completely enclose said coil.

13. A hair waving pad comprising, a flexible metallic container, a chemical therein, adapted to produce heat when contacted with moisture, means to apply moisture to the chemical, and a metallic flap projecting at one edge of the container and adapted to be folded thereover.

RALPH L. EVANS.